Nov. 4, 1930.   F. KUHN   1,780,826
HANDLE ASSEMBLY
Filed Dec. 27, 1927
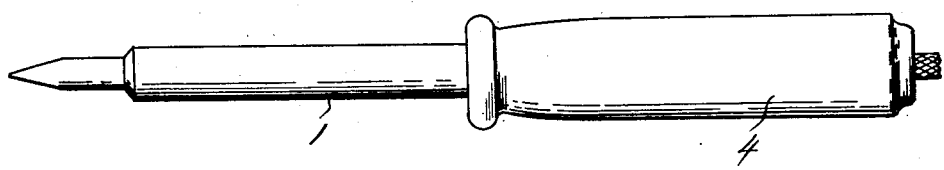
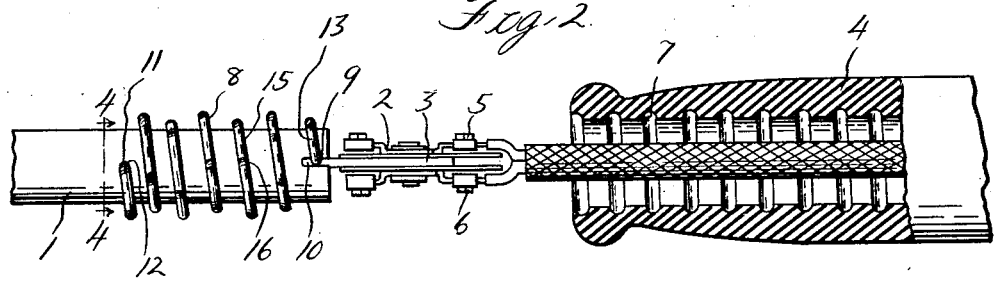
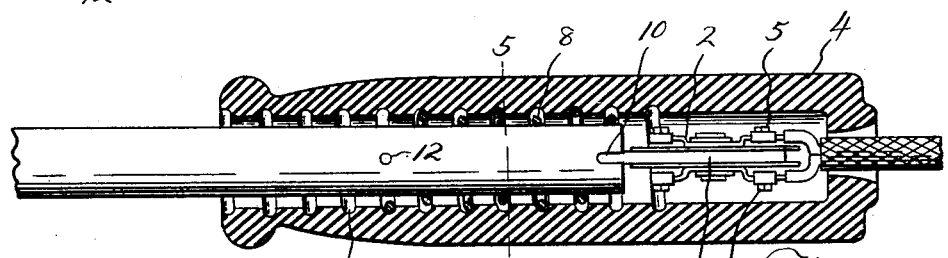
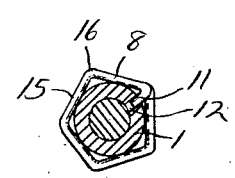
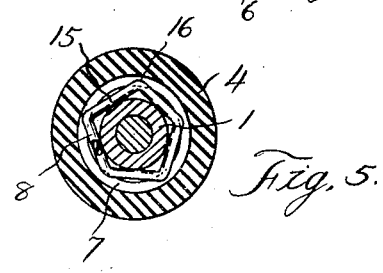
Inventor
Frank Kuhn Patented Nov. 4, 1930

1,780,826

UNITED STATES PATENT OFFICE

FRANK KUHN, OF DETROIT, MICHIGAN, ASSIGNOR TO AMERICAN ELECTRICAL HEATER COMPANY, OF DETROIT, MICHIGAN, A CORPORATION OF MICHIGAN

HANDLE ASSEMBLY

Application filed December 27, 1927. Serial No. 242,947.

This invention relates generally to means for attaching handles to the shanks of tools, and refers more particularly to a means for attaching a handle to an electrically heated shank of a soldering iron.

One of the essential objects of the invention is to provide an attaching means of this type that enables the handle to be easily and quickly mounted on the shank and that is also capable of yieldably retaining the handle in assembled position upon the shank of the tool.

Another object is to provide an attaching means that is constructed and arranged in such a way with respect to the shank and handle that direct heat conducting contact between the shank and handle is interrupted.

Another object is to provide an assembly that is simple and neat yet strong and durable in construction and that can be manufactured at a comparatively low cost.

With the above and other objects in view the invention consists of certain novel features of construction, combinations and arrangements of parts, as will be hereinafter more fully described, and particularly pointed out in the appended claims.

In the accompanying drawings:

Figure 1 is an elevation of a tool embodying my invention;

Figure 2 is a view of the shank and helix with the handle removed therefrom;

Figure 3 is a longitudinal sectional view through the handle;

Figure 4 is a section on the line 4—4 of Figure 2;

Figure 5 is a section on the line 5—5 of Figure 3.

Referring now to the drawing, 1 is a shank, 2 is a terminal plate for an electrical conductor 3, and 4 is a handle of an electrical soldering iron. As shown the shank 1 is preferably a metal tube and is cylindrical in form. The terminal plate 2 is rigidly secured to and in alignment with the shank 1 at an end thereof, and carries suitable clamping means such as the screws 5 and 6 respectively for holding the wires of the electrical conductor 3. The handle 4 is a substantially cylindrical tube of non-conducting material such as rubber or rubber composition, and is provided throughout its length with an internal thread 7.

Mounted on the shank 1, preferably at the rear end thereof, adjacent to the terminal plate 2 is a wire helix 8 that is relatively short and is constructed and arranged to simulate an external thread on the shank for threaded engagement with the internal thread 7 of the handle. Preferably the pitch of the internal thread 7 is the same throughout its length, whereas the pitch of the last two or three convolutions of the helix is less than the pitch of the internal thread. Moreover, one end convolution of the helix has an offset portion 9 that is received in an elongated slot 10 extending longitudinally of the shank 1, preferably at the rear end thereof, and the opposite end convolution of the helix has an offset portion 11 that is received in a circular opening 12 in the shank 1.

Thus with this construction the slotted engagement of the offset portion 9 with the shank 1 will permit movement of all but the end convolution 13 of the helix longitudinally of the shank 1 rearwardly of the opening 12, but is effectively prevented by engagement of the offset portions 9 and 11 respectively with the slot 10 and opening 12 from turning or unwinding on the shank. If desired, the offset portion 9 and slot 10 may be dispensed with entirely, in which event the end convolution 13 would be free to move relatively to the shank, and a simpler construction would be provided.

In use, when the handle 4 is threaded almost home on the helix 8 on the shank 1, the last convolutions of the helix will be moved longitudinally of the shank by the walls of the internal threads 7 of the handle, and in so moving they will be under tension and will bind and frictionally engage the walls of said internal thread. Accordingly the handle will be effectively but yieldably and detachably held in assembled position upon the shank, and when so mounted the handle holds and conceals the terminal plate 2 and the adjacent end portion of the shank, so that a neat construction is provided. Preferably this helix 8 has flat portions 15 engaging the shank 1 and has projecting portions or corners 16 intermediate said flat portions engaging the internal thread 7 of the handle. Thus the spaced portions 16 only of the helix engage the handle and direct heat conducting contact between the shank and handle is effectively interrupted. As a result, the handle will not get so hot while the tool is in use.

In the process of construction the helix 8 is wound on a flattened mandrel and is of a size to bear with its flat portions firmly against the shank of the iron.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In combination, a cylindrical shank having a smooth external surface, and a helix having spaced convolutions sleeved upon said external surface and having one end secured to said shank, the convolutions at the other end of the helix being freely movable longitudinally of the external surface of the shank, the pitch of the convolutions at the fixed end of the helix being less than the pitch of the convolutions at the other end thereof.

2. In combination, a cylindrical shank, and a helix having polygonal convolutions sleeved upon said shank and having one end secured thereto, the convolutions at the other end of the helix being freely movable longitudinally of the shank, the pitch of the convolutions at the fixed end being less than the pitch of the convolutions at the other end of the helix.

3. In combination, a shank, a helix having quinquangular convolutions sleeved upon said shank, one of said convolutions being secured to said shank, certain of said convolutions being freely movable longitudinally of the shank.

In testimony whereof I affix my signature.

FRANK KUHN.